(12) United States Patent
Haida et al.

(10) Patent No.: US 9,415,704 B2
(45) Date of Patent: Aug. 16, 2016

(54) VEHICLE SEAT HAVING AN ADJUSTING DEVICE

(75) Inventors: Stefan Haida, Remscheid (DE); Dirk Schulz, Remscheid (DE); Holger Finner, Hückeswagen (DE); Adrian Pawlowski, Köln (DE); Patrick Jakob, Korschenbroich (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 207 days.

(21) Appl. No.: 13/816,200

(22) PCT Filed: Aug. 10, 2011

(86) PCT No.: PCT/EP2011/004004
§ 371 (c)(1),
(2), (4) Date: Apr. 4, 2013

(87) PCT Pub. No.: WO2012/019763
PCT Pub. Date: Feb. 16, 2012

(65) Prior Publication Data
US 2013/0207431 A1  Aug. 15, 2013

(30) Foreign Application Priority Data
Aug. 10, 2010  (DE) .......... 10 2010 033 957

(51) Int. Cl.
| B60N 2/22 | (2006.01) |
| B60N 2/44 | (2006.01) |
| B60N 2/10 | (2006.01) |
| B60N 2/16 | (2006.01) |

(52) U.S. Cl.
CPC .. *B60N 2/22* (2013.01); *B60N 2/10* (2013.01); *B60N 2/16* (2013.01); *B60N 2/444* (2013.01)

(58) Field of Classification Search
USPC .......................................... 297/362
See application file for complete search history.

(56) References Cited

U.S. PATENT DOCUMENTS

| 3,972,563 | A | * | 8/1976 | Gustafsson | 297/362 |
| 4,211,451 | A | * | 7/1980 | Shephard | 297/362 |
| 4,884,844 | A | * | 12/1989 | Kershaw | B60N 2/2252 297/362 |
| 6,283,886 | B1 | * | 9/2001 | Schumann | B60N 2/4435 192/15 |
| 6,830,298 | B2 | * | 12/2004 | Koczewski | 297/362 |
| 7,677,665 | B2 | * | 3/2010 | Eppert et al. | 297/362.11 |
| 7,726,742 | B2 | * | 6/2010 | Keyser et al. | 297/362 |

(Continued)

FOREIGN PATENT DOCUMENTS

| DE | 10 2004 061 062 A1 | 6/2006 |
| DE | 10 2007 038 833 A1 | 9/2008 |

(Continued)

OTHER PUBLICATIONS

International Search Report received in connection with international application No. PCT/EP2011/004004; dtd Nov. 15, 2011.

(Continued)

*Primary Examiner* — Timothy J Brindley
(74) *Attorney, Agent, or Firm* — Foley & Lardner LLP

(57) ABSTRACT

A vehicle seat includes an adjusting device, for example for adjusting the height and/or tilt of a seat part structure and/or of a backrest structure connected to the seat part structure, wherein the adjusting device is fastened to the seat part structure.

10 Claims, 2 Drawing Sheets

(56) References Cited

U.S. PATENT DOCUMENTS

Figure 5:
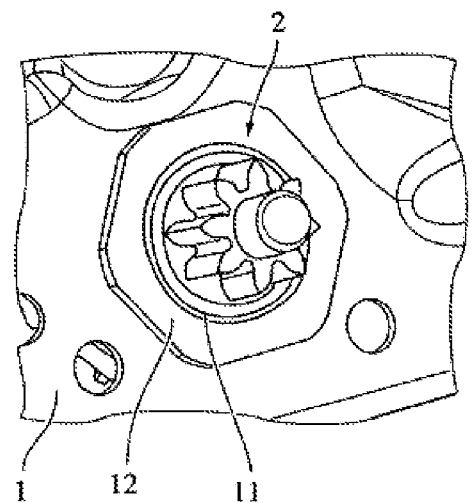

| | | | |
|---|---|---|---|
| 8,672,796 B2* | 3/2014 | Schulz et al. | 475/323 |
| 8,783,774 B2* | 7/2014 | Berres et al. | 297/362.11 |
| 2006/0158014 A1* | 7/2006 | Kawashima | B60N 2/2252 297/362 |
| 2008/0238172 A1* | 10/2008 | Maeda | B60N 2/0232 297/362 |
| 2010/0194163 A1* | 8/2010 | Cha | B60N 2/0232 297/362 |
| 2011/0169313 A1* | 7/2011 | Schulz et al. | 297/362 |
| 2011/0254337 A1* | 10/2011 | Jiang | B60N 2/2252 297/362 |
| 2011/0304188 A1* | 12/2011 | Aktas | B60N 2/2218 297/362 |
| 2013/0009438 A1* | 1/2013 | Stemmer et al. | 297/362 |
| 2015/0283924 A1* | 10/2015 | Boutouil | B60N 2/2251 297/362 |

FOREIGN PATENT DOCUMENTS

| | | | |
|---|---|---|---|
| JP | 2010-508198 A | 3/2010 | |
| WO | WO-2008/052761 A1 | 5/2008 | |
| WO | WO2008052761 A1 * | 5/2008 | B60N 2/225 |
| WO | WO 2010 009893 A1 | 1/2010 | |

OTHER PUBLICATIONS

International Preliminary Report on Patentability in PCT/EP2011/004004 dated Feb. 12, 2013.

Office Action dated Feb. 3, 2015 in corresponding Japanese Application No. 2013-523532, 5 pages.

* cited by examiner

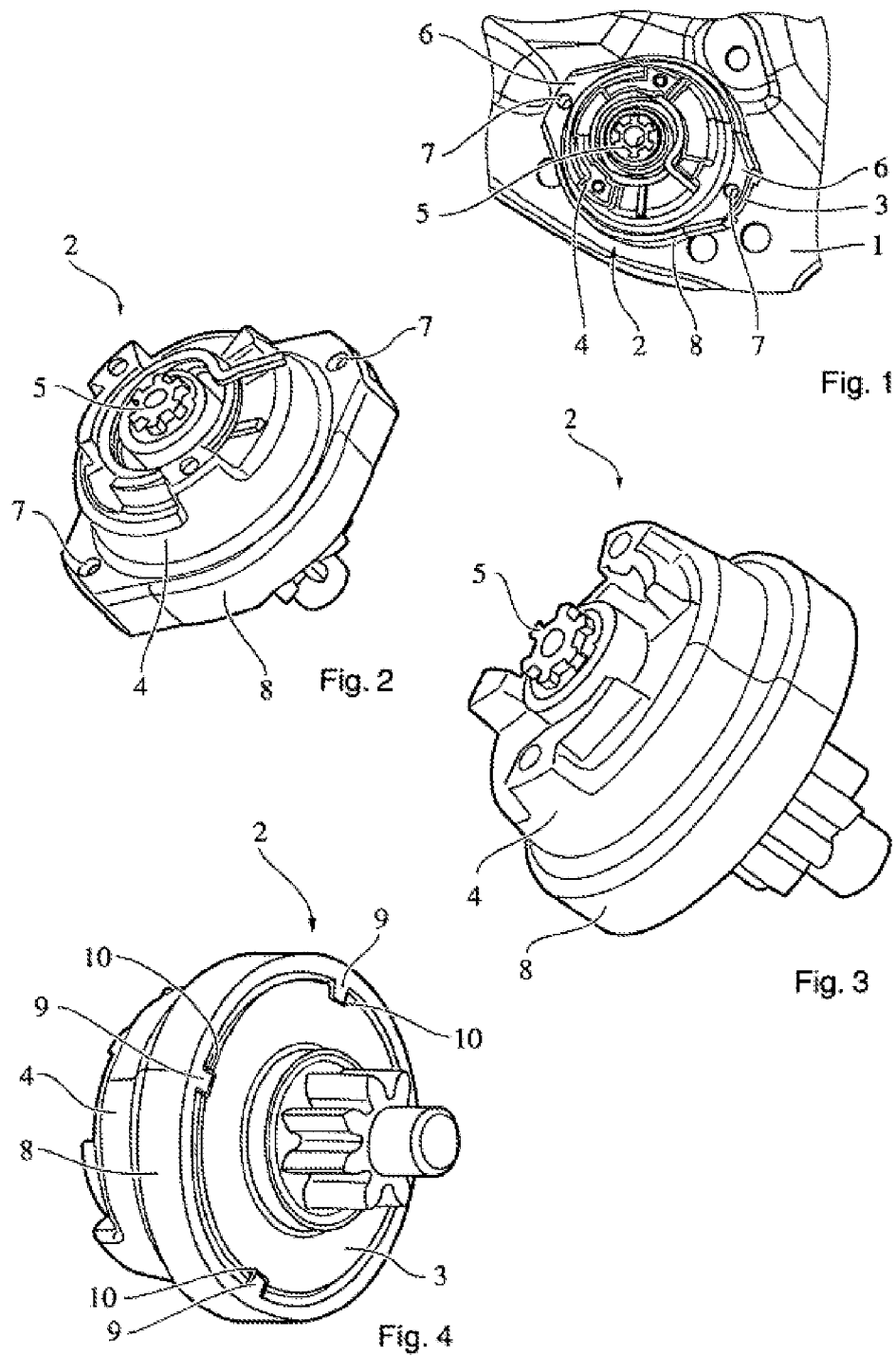

VEHICLE SEAT HAVING AN ADJUSTING DEVICE

CROSS REFERENCE TO RELATED APPLICATIONS

The present application is a National Stage of International Application No. PCT/EP2011/004004 filed on Aug. 10, 2011, which claims the benefit of German Patent Application No. 10 2010 033 957.1 filed on Aug. 10, 2010, the entire disclosures of which are incorporated herein by reference.

The present invention relates to a vehicle seat having an adjusting device for example for the height and/or tilt adjustment of a seat part structure and/or of a backrest structure connected to the seat part structure, wherein the adjusting device is fastened to the seat part structure.

Such vehicle seats having adjusting devices are generally known in the prior art and disclosed for example in documents DE 10 2004 061 062 A1 and DE 10 2007 038 833 A1. However, a disadvantage with the known adjusting devices is that their fastening to a seat part structure usually requires complicated fastening means which have a comparatively high space-occupying design, and/or that loads are only insufficiently transmitted between the vehicle seat and the adjusting device.

The object of the present invention is therefore to make available a vehicle seat having an adjusting device, in particular for height and/or tilt adjustment, which allows a particularly advantageous load transmission between vehicle seat and adjusting device and at the same time can be produced in a particularly compact manner in terms of construction space and consequently with comparatively low material outlay.

This object is achieved by a vehicle seat which has an adjusting device by means of which the seat part structure and/or the backrest is adjustable relative to the body of a vehicle, wherein the adjusting device has a braking ring which is part of a releasable locking mechanism of an adjusting gear and the adjusting device has a housing, and wherein a means for a form and/or friction lock connection to the housing is provided on the braking ring.

The present invention relates to a vehicle seat having an adjusting device, for example in order to adjust the vehicle seat as a whole in its height and/or the seat surface in its inclination relative to the body of the vehicle. The adjusting mechanism is preferably a so-called pump mechanism. Furthermore, according to the invention, the vehicle seat has a braking ring which is part of a releasable locking mechanism of the adjusting gear. This locking mechanism makes it possible to prevent for example, in the event of an accident, forces and/or torques from being transmitted from the adjusting gear to the drive of the adjusting mechanism. Furthermore, the adjusting device of the vehicle seat according to the invention has a housing which in particular at least partially surrounds the braking ring and/or the adjusting gear. This housing generally has on one side an opening through which the adjusting gear is connected to the drive, for example a handle, in particular a wheel or a lever. The housing is preferably formed from plastic. Provision is now made according to the invention for there to be provided on the braking ring at least one means, preferably several means, which are in particular arranged equidistantly to one another and which are intended for a form and/or friction lock fixing to the housing. The means interacts as a form and/or friction lock fixing with a complementary means, which is arranged on the housing, and at least partially prevents a relative movement between the housing and the braking ring, preferably in the axial and/or radial direction. The means is preferably situated on the periphery of the braking ring. The embodiment according to the invention affords a particularly compact construction of the adjusting device and consequently a lower material outlay and/or a better flow of forces. The braking ring can be attached directly to the seat part structure and/or the backrest, thereby improving load transmission. The housing is preferably connected to the braking ring without tools, for example by means of a snap connection, in particular a releasable snap connection.

According to a further or a preferred subject of the present invention, there is provided on the braking ring a means by which the braking ring can be releasably fastened to the seat part structure or the backrest.

The statements made in relation to this subject of the present invention apply equally to the other subject matter of the present invention, and vice versa.

The means is preferably a thread which interacts with a mating thread, in particular a nut. This is preferably an external thread. The thread of the braking ring is preferably plugged through an opening in the seat part structure and/or in the backrest and a nut is then screwed onto the thread.

The following statements apply equally to both subjects of the present invention.

The means which is provided on the braking ring and which interacts with a complementary means on the housing is preferably an indentation and/or protuberance. The means is preferably formed as a fastening flange, wherein the fastening flange preferably has a cutout through which can engage a fastening element, in particular a screw or rivet. It is also conceivable for the means to be a fastening groove and/or a fastening wedge.

In a preferred embodiment, the braking ring has an aligning means which interacts with the seat part structure or the backrest and fixes the braking ring in its position relative thereto. This embodiment has the advantage in particular that the braking ring is situated in a defined position before it is connected to the seat part structure and/or the backrest.

The braking ring is preferably connected to the seat part structure or the backrest in an integrally bonded manner, in particular by welding, very particularly preferably by laser welding.

According to a further or a preferred subject of the present invention, the braking ring is provided at least partially in one piece with the seat part structure, in particular with the seat side part and/or the backrest. For example, the braking ring can be integrally formed in a side part of the seat part or of the backrest.

The adjusting device is preferably a seat structure part height adjuster and/or seat structure part tilt adjuster.

Exemplary embodiments of the invention are illustrated in the figures and are explained in more detail in the description which follows. These explanations are given merely by way of example and do not limit the general idea of the invention. The statements apply equally to all subjects of the present invention.

Figure 6:
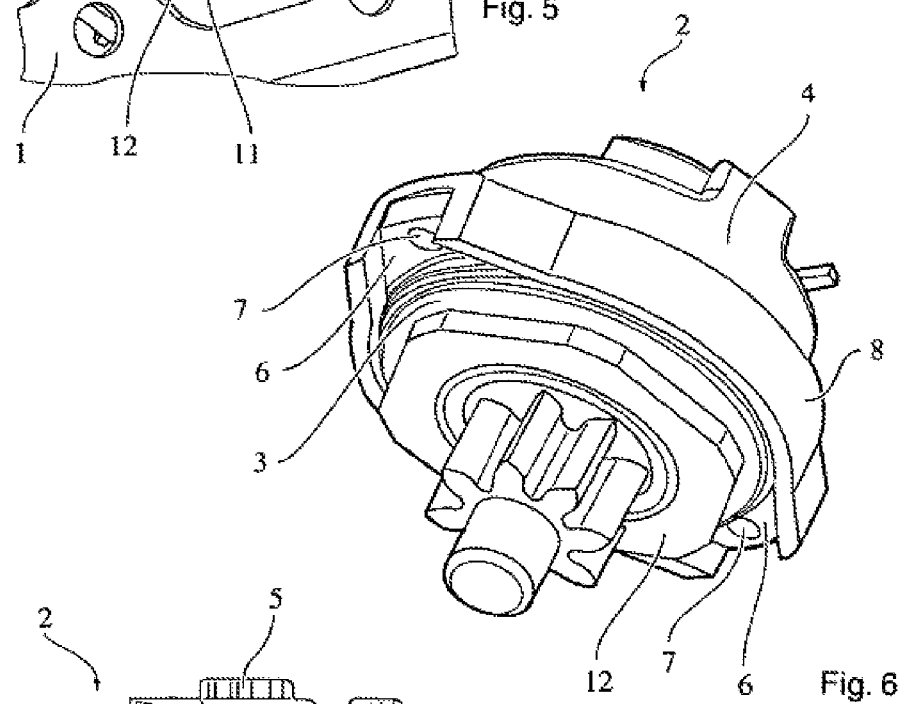
Figure 7:
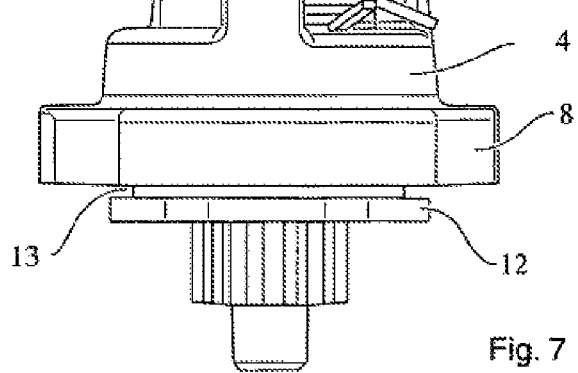
Figure 8:
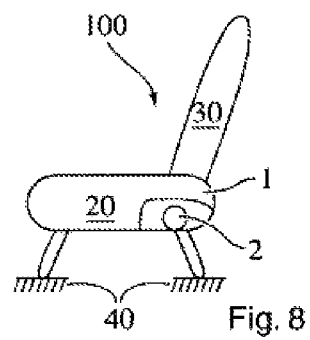

FIGS. 1 and 2 show schematic representations of a first embodiment of the adjusting device according to the invention in two different views, FIGS. 3 and 4 show schematic representations of a second embodiment of the adjusting device according to the invention in two different views, FIGS. 5, 6 and 7 show schematic representations of a third embodiment of the adjusting device according to the invention in three different views, FIG. 8 shows a schematic side view of a vehicle seat according to the invention.

In FIG. 8 there is shown a vehicle seat 100 according to the invention which has a seat part structure 20, a backrest 30 and a seat substructure 40, in particular a vehicle body 40. The seat part structure 20 comprises a seat side part 1 on which an adjusting device 2 according to the invention is here fastened for the purpose of adjusting the height and/or tilt of the seat part structure 20 and/or of the backrest 30.

FIG. 1 schematically shows a 3D view of a first embodiment of an adjusting device 2 according to the invention which is fastened from outside to a seat side part 1 of a vehicle seat 100. The adjusting device 2 comprises a braking ring 3, which extends parallel to the surface of the seat side part 1, and a housing 4 which is arranged on the braking ring 3 and which encloses an adjusting gear 5 intended here for the height and/or tilt adjustment of the seat part structure 20 and/or of the backrest 30. The braking ring 3 comprises, in particular in one piece, a fastening flange 6 which has cutouts 7 through which there can engage fastening elements (not shown), for example screws or rivets. The flange 6 interacts as a form and/or friction lock fixing with the housing 4 and thereby prevents at least substantially a relative movement between the braking ring and the housing, in particular in the axial and/or radial direction. The housing 4 preferably likewise has corresponding cutouts through which the fastening means likewise engage such that a friction lock fixing can be produced between the braking ring 3 and the housing 4 both in the axial and in the radial direction. It is thus possible to secure the braking ring 3 in an advantageous manner against rotations and axial movements with respect to the housing 4. A person skilled in the art will understand that the braking ring can also be provided in one piece with the seat part structure, in particular the side part 1 of the frame of the seat part, or the braking ring can be connected in an integrally bonded manner to the seat part structure. As can be seen in FIG. 2 and in particular in FIG. 6, the housing 4 also has a circumferential surface 8 which encloses the braking ring in a form-locking manner at least in certain portions and thus additionally secures it, for example against rotation. It is preferably further provided that the seat side part 1 also has cutouts which allow an attachment of the braking ring 3 to the seat side part 1 by means of the fastening elements. It is thereby possible in a particularly simple manner for the entire adjusting device 2 to be secured rotationally and/or axially with respect to the seat side part 1.

FIG. 3 schematically shows a 3D view of a second embodiment of the adjusting device 2 according to the invention, wherein the braking ring 3 and the housing 4 have a circular cross-sectional area in the axial direction and the braking ring 3 is at least partially enclosed by an annular circumferential surface 8 of the housing 4. As can be seen in FIG. 4, the housing 4 comprises a plurality of fastening wedges 9 which engage in a form-locking manner in grooves 10 formed on the underside of the braking ring 3 and thus prevent rotation between the housing 4 and the braking ring 3. For the second embodiment of the adjusting device 2, it is provided that the braking ring 3 is attached to the seat side part 1 by means of a welded connection, for example by laser welding, with the result that a particularly robust and compact connection is produced between the adjusting device 2 and the seat side part 1. To position the braking ring 3 relative to the seat side part 1, it is preferably provided that the braking ring 3 has orienting means (not shown), wherein the orienting means are designed for example as pegs which engage in positioning holes of the seat side part 1. The housing is preferably connected to the braking ring by means of a quick-action fastener.

FIG. 5 schematically shows a 3D view of a third embodiment of the adjusting device 2 on the inwardly pointing side of the seat side part 1, wherein a threaded flange 11 of the braking ring 3 engages through an opening (not visible in the figure) of the seat side part 1. The threaded flange 11 has an external thread on which a nut 12 can be screwed in order to produce a friction lock fixing between the seat side part 1 and the braking ring 3. In the side view of the adjusting device 2 illustrated in FIG. 7, there can clearly be seen the clamping gap 13 which is formed between the nut 12 and the braking ring 3 and in which the seat side part 1 is clamped. The braking ring 3 is thus secured in a simple manner against rotations and axial movements with respect to the seat side part 1. As can be seen in FIG. 6, the braking ring 3 preferably further has a fastening flange 6 according to the embodiment illustrated in FIGS. 1 and 2, with the result that a stable attachment of the housing 4 to the braking ring 3 is also made possible. As a result, the entire adjusting device 2 is advantageously secured rotationally and axially with respect to the seat side part 1.

It is evident for a person skilled in the art that the securing means described in the three embodiments for rotationally securing and axially securing the braking ring 3 with respect to the housing 4 and/or with respect to the seat side part 1 can be combined with one another in an advantageous manner in any way.

LIST OF REFERENCE SIGNS

1 Seat side part
2 Adjusting device
3 Braking ring
4 Housing
5 Adjusting gear
6 Fastening flange
7 Cutouts
8 Circumferential surface
9 Fastening wedges
10 Grooves
11 Threaded flange
12 Mating thread, nut
13 Clamping gap
20 Seat part structure
30 Backrest
40 Seat substructure, vehicle body
100 Vehicle seat

The invention claimed is:

1. A vehicle seat comprising:
an adjusting device through which at least one of a seat part structure and a backrest is adjustable relative to a body of a vehicle, wherein the adjusting device includes:
a braking ring which is part of a releasable locking mechanism of an adjusting gear, wherein the adjusting gear is configured to adjust at least one of a height and tilt of at least one of the seat part structure and the backrest,
wherein the braking ring has a substantially circular cross-sectional area,
wherein the braking ring includes a plurality of grooves formed on a portion of the braking ring that extend within the substantially circular cross-sectional area of the braking ring,
wherein the grooves are arranged equidistantly from one another on the braking ring when the braking ring includes more than two grooves;
a housing surrounding at least one of the braking ring and the adjusting gear,
wherein the housing has an opening on one side through which the adjusting gear is connectable to at least one of a drive, handle, wheel, and lever, wherein the housing comprises a plurality of fastening wedges, wherein the fastening wedges are configured to engage in a form-locking manner in the grooves in order to fix the braking ring and the housing together such that relative movement in at least one of the axial and radial direction between the housing and the braking ring is prevented, wherein the braking ring includes a threaded flange that has a thread; and a nut including a mating thread that is configured to engage with the thread of the threaded flange of the braking ring, wherein the nut is configured to form a clamping gap between the braking ring and the nut when the mating thread of the nut is engaged with the thread of the threaded flange, wherein the clamping gap is configured to receive a portion of the seat part structure and the nut is configured to clamp the portion of the seat part structure within the clamping gap between the braking ring and the nut as the mating thread of the nut is threaded onto the thread of the threaded flange of the braking ring, wherein the clamping of the portion of the seat part structure fastens the adjusting device to the portion of the seat part structure such that at least one of the height and tilt of at least one of the seat part structure and of the backrest can be adjusted.

2. The vehicle seat as claimed in claim 1, wherein the thread of the threaded flange is configured to extend through an opening in the portion of the seat part structure.

3. The vehicle seat as claimed in claim 1, wherein the braking ring has an aligning mechanism which interacts with the seat part structure or the backrest and fixes the braking ring in its position.

4. The vehicle seat as claimed in claim 1, wherein the braking ring is connected in an integrally bonded manner to the seat part structure or the backrest.

5. The vehicle seat as claimed in claim 1, wherein the braking ring is one piece with the seat part structure.

6. The vehicle seat as claimed in claim 1, wherein the adjusting device is at least one of a seat structure part height adjuster and seat structure part tilt adjuster.

7. The vehicle seat as claimed in claim 1, wherein the braking ring is rotationally and axially secured to at least one of the seat part structure and the backrest.

8. The vehicle seat as claimed in claim 1, wherein the braking ring directly contacts at least one of the seat part structure and the backrest.

9. The vehicle seat as claimed in claim 1, wherein the braking ring and the nut each directly contact the portion of the seat part structure that is clamped within the clamping gap while the mating thread of the nut is threaded onto the thread of the threaded flange of the braking ring.

10. The vehicle seat as claimed in claim 1, wherein the braking ring directly contacts a first side of the portion of the seat part structure that is clamped within the clamping gap and the nut directly contacts a second side of the portion of the seat part structure that is clamped within the clamping gap while the mating thread of the nut is threaded onto the thread of the threaded flange of the braking ring.

* * * * *